United States Patent
Hagiwara

(10) Patent No.: US 7,495,784 B2
(45) Date of Patent: Feb. 24, 2009

(54) PRINTER WITH PRINT ORDER CALCULATION BASED ON PRINT CREATION TIME AND PROCESS RATIO

(75) Inventor: Takahiro Hagiwara, Chiba (JP)

(73) Assignees: Kabushiki Kiasha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 642 days.

(21) Appl. No.: 11/272,961

(22) Filed: Nov. 14, 2005

(65) Prior Publication Data
US 2007/0109590 A1 May 17, 2007

(51) Int. Cl.
G06K 15/02 (2006.01)
G06K 15/16 (2006.01)

(52) U.S. Cl. .................... 358/1.12; 358/1.13

(58) Field of Classification Search ............... 358/1.12, 358/1.13, 1.14, 501, 401, 468, 498, 296; 399/16, 381, 397, 403, 405; 271/298
See application file for complete search history.

(56) References Cited

U.S. PATENT DOCUMENTS 5,678,111 A * 10/1997 Matsumoto ............... 271/298
6,157,436 A * 12/2000 Cok ........................ 399/84
2006/0203256 A1 * 9/2006 Hagiwara ................. 358/1.13
2008/0192281 A1 * 8/2008 Hagiwara ................. 358/1.15

FOREIGN PATENT DOCUMENTS

JP 2001-127928 5/2001
JP 2003-143370 5/2003

* cited by examiner

Primary Examiner—Scott A Rogers
(74) Attorney, Agent, or Firm—SoCal IP Law Group LLP; Steven C. Sereboff

(57) ABSTRACT

A program execution unit of an MFP apparatus does not use a preset priority for each kind of job or a print estimated time with low precision. Instead, the program execution unit controls a print order of pages of print images, which are generated by each job, so as to maximize the operation rate of a print engine. Printed matters, which include pages of respective jobs in a mixed fashion, are sorted according to jobs in a subsequent stage. Thereby, grouping, which is similar to the prior art, is executed, thereby realizing a print control which requires no exceptional operation.

10 Claims, 11 Drawing Sheets

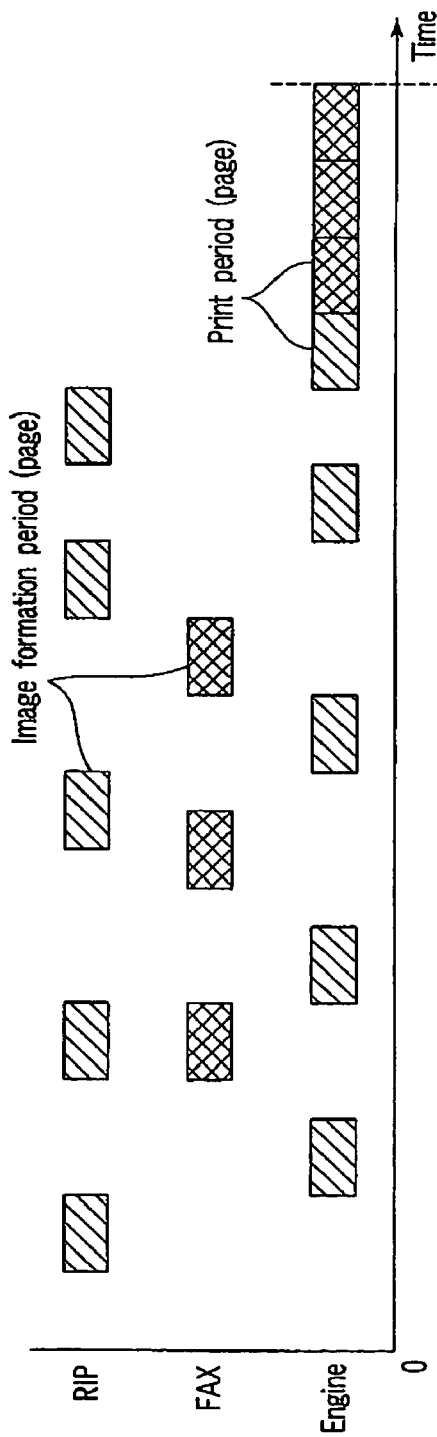
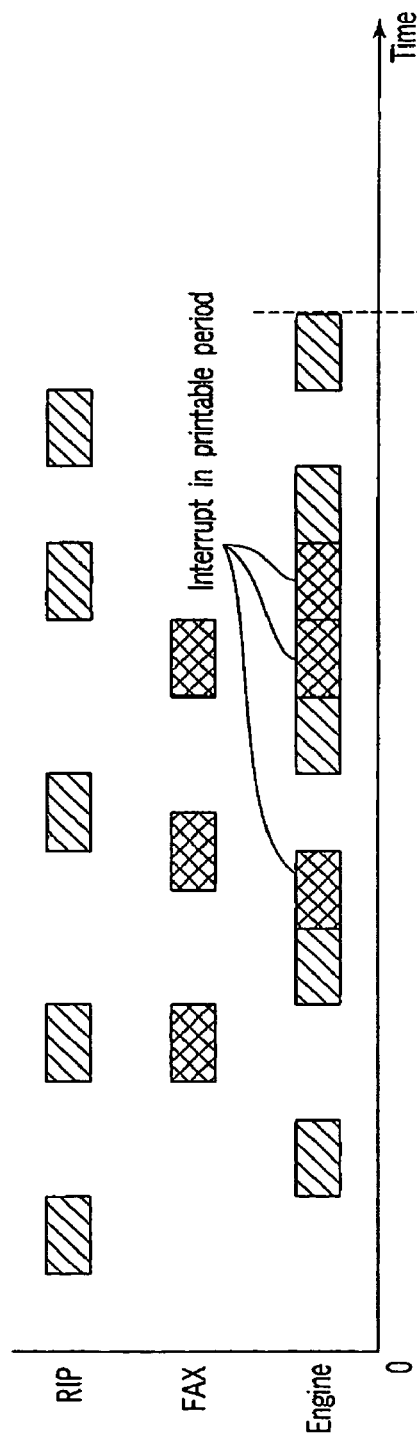
FIG. 4
FIG. 5

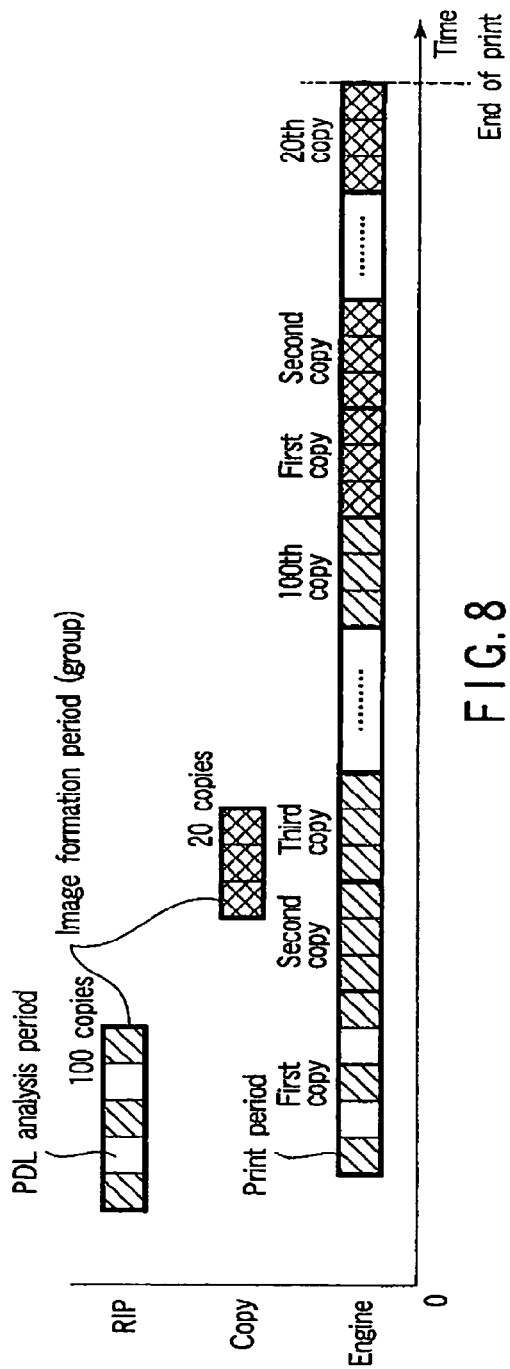
F I G. 8
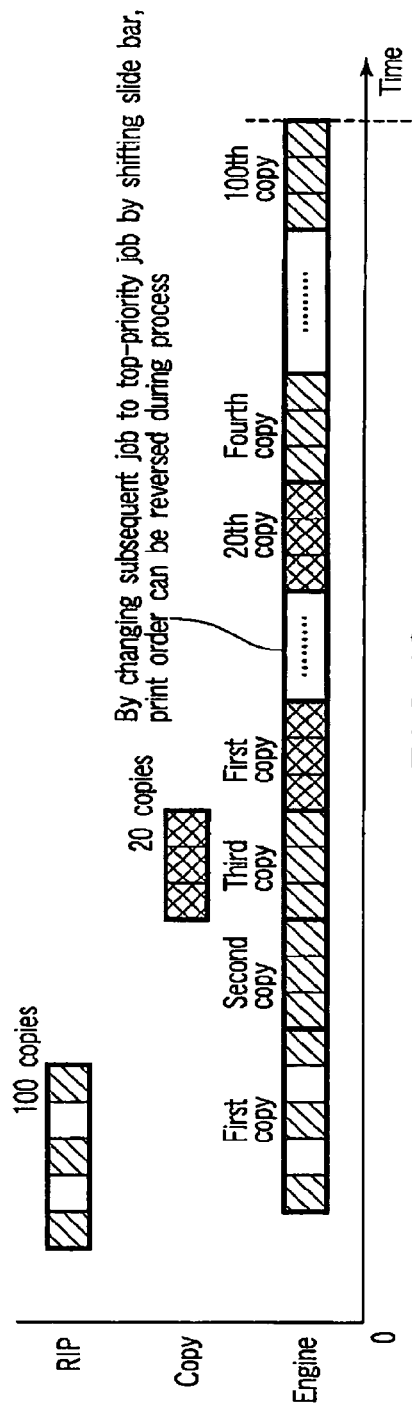
F I G. 10

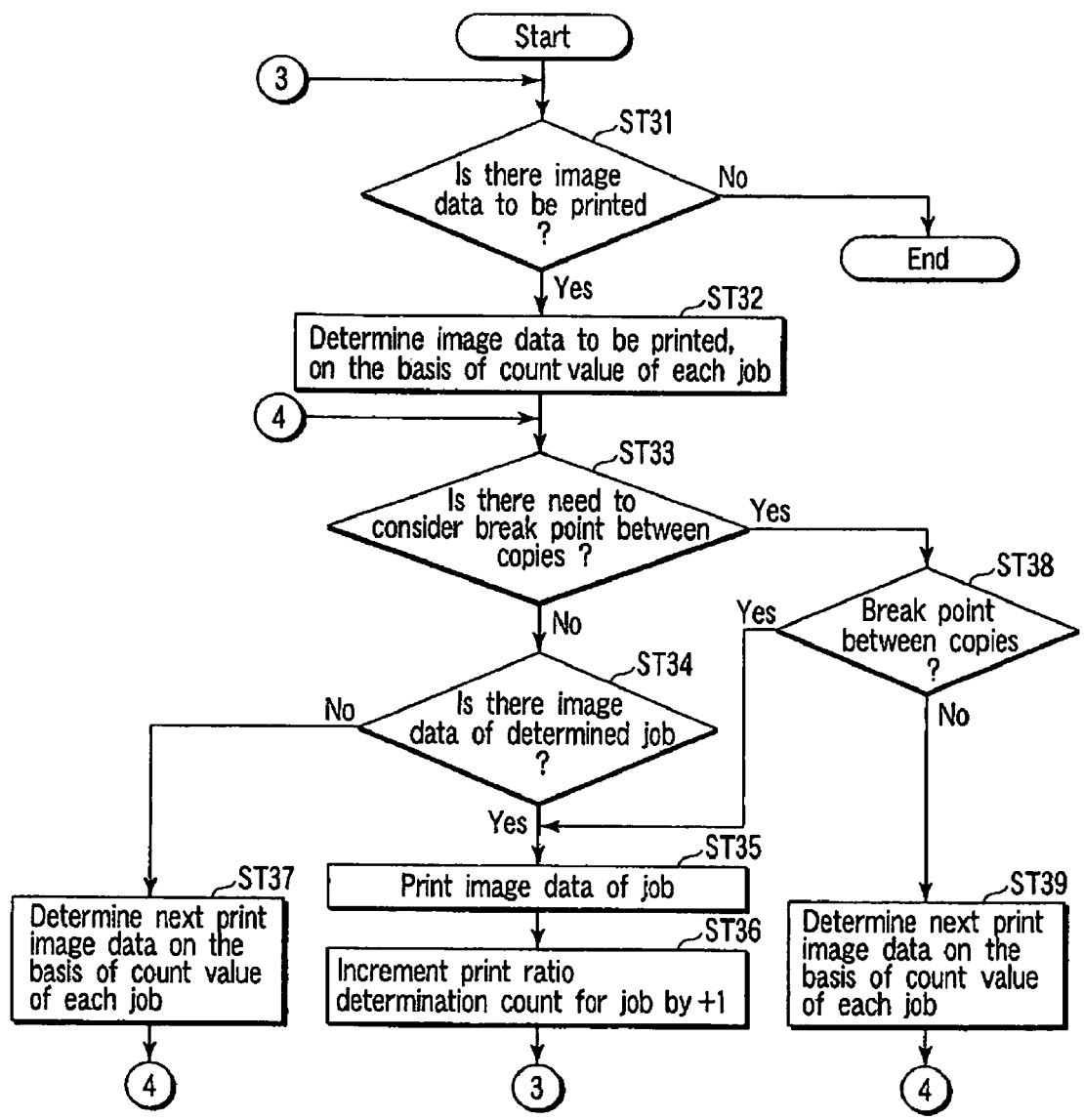
F I G. 14

| Engine speed | Remaining time until counter reset |
|---|---|
| 60 | 40 |

| Job no. | Print ratio | Print distribution value | Current counter value | Difference | Priority |
|---|---|---|---|---|---|
| 1 | 30 | 6 | 2 | -4 | 1 |
| 2 | 10 | 2 | 1 | -2 | 2 |
| 3 | 60 | 12 | 17 | +5 | 3 |

US 7,495,784 B2

PRINTER WITH PRINT ORDER CALCULATION BASED ON PRINT CREATION TIME AND PROCESS RATIO

BACKGROUND OF THE INVENTION

1. Field of the Invention

The present invention relates to a printer that has a plurality of functions and executes printing, such as a digital multi-function peripheral (MFP), and to a print processing method.

2. Description of the Related Art

Jpn. Pat. Appln. KOKAI Publication No. 2001-127928 discloses a conventional method for a digital multi-function peripheral (MFP). In this method, in accordance with the priority based on job kinds between a job in printing and a job in a print queue, an estimated time until completion of print and a set value of a print order that is arbitrarily preset by a user, a priority assigning process for print jobs is executed. It is thus automatically determined whether a job in a print queue is to be preferentially printed, or whether a job in printing is continuously printed.

In the method of KOKAI No. 2001-127928, however, the order of print is determined based on the preset priority for each kind of job and the estimated time until completion of print. If a preset priority is improper or if there are many jobs, the time of actual print of each of which is greatly different from the estimated time, an optimal print-order control for the user cannot be executed.

BRIEF SUMMARY OF THE INVENTION

The object of an aspect of the present invention is to provide a printer and a print processing method, which can execute an optimal print-order control by fairly performing print-out at a desired ratio per unit time.

According to an aspect of the present invention, there is provided a print processing method for a printer that has a plurality of functions and a plurality of paper output methods and executes print for each of the functions, comprising: executing, when prints by the plurality of functions are simultaneous/parallel processed, printing of print images, which are created by image processes associated with the respective functions, by calculating a print order on the basis of a time at which each print image is created and a preset print process ratio between the functions; executing, when the preset print process ratio is altered where necessary during the printing, printing of remaining print images at the time of the alteration by re-calculating the print order on the basis of the altered process ratio; and sorting paper sheets, on which the printing is effected, according to each of the functions by the plurality of paper output methods.

According to another aspect of the present invention, there is provided a printer that has a plurality of functions and a plurality of paper output methods and executes print for each of the functions, comprising: a printing unit which prints a print image that is created by each of the functions; a setting unit which sets, when prints by the plurality of functions are simultaneous/parallel processed, a print process ratio between the functions, which is used to determine a priority of print processes; a processing unit which executes a print process by the printing unit, by determining a print order on the basis of the print process ratio between the functions, which is preset by the setting unit, and a time at which each print image is created according to each function is created; an altering unit which alters the print order, when the print process ratio is altered by the setting unit where necessary during the print process by the processing unit, by re-calculating the print order on the basis of a number of remaining print images at the time of the alteration and the altered print process ratio; and a control unit which executes a control to sort paper sheets, which are printed by the printing unit, according to each of the functions by the plurality of paper output methods.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

FIG. 4 is a view illustrating a timing of generating/printing pages of each print job in the prior art;

FIG. 5 shows an example of interrupt print, to which the present invention is applied;

FIG. 8 illustrates a timing in the prior art in a case where a network print job for 100 copies and a copying job for 20 copies are overlapped;

FIG. 10 illustrates a timing in the present invention in a case where a network print job for 100 copies and a copying job for 20 copies are overlapped;

FIG. 14 is a flow chart illustrating an operation for determining a print image;

DETAILED DESCRIPTION OF THE INVENTION

An embodiment of the present invention will now be described with reference to the accompanying drawings.

Figure 1:
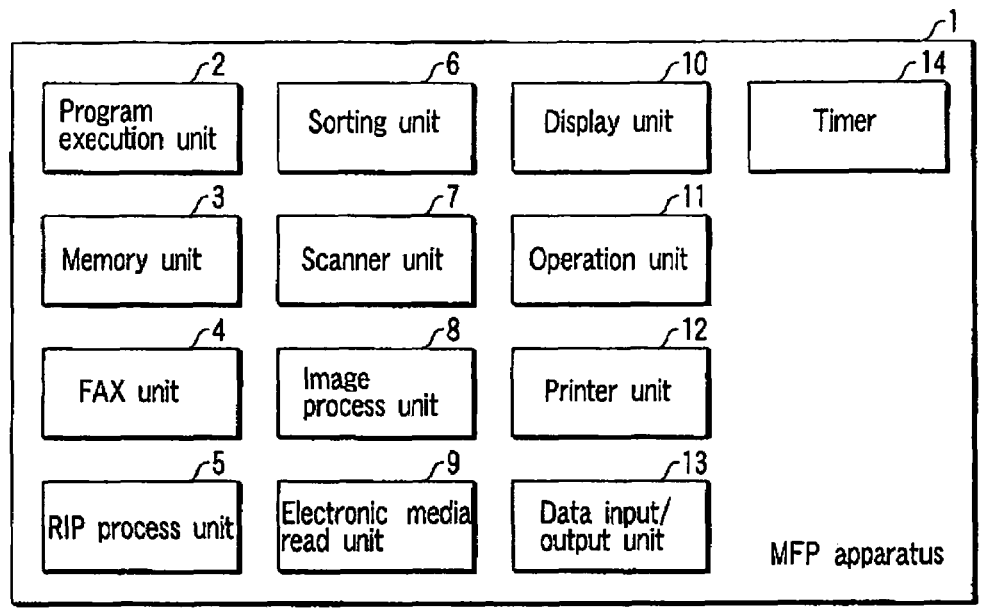
FIG. 1 is a block diagram that schematically shows the structure of an MFP apparatus according to a printer of the present invention.

FIG. 1 schematically shows the structure of an MFP (Multi-Function Peripheral) apparatus 1 according to a printer of the present invention. The MFP apparatus 1 comprises a program execution unit 2, a memory unit 3, a FAX unit 4, a RIP process unit 5, a sorting unit 6, a scanner unit 7, an image process unit 8, an electronic media read unit 9, a display unit 10, an operation unit 11, a printer unit 12, a data input/output unit 13, and a timer 14.

The MFP apparatus 1 is an apparatus in which various functions are integrated, as shown in FIG. 1.

The FAX unit 4 generates image data by decoding encoded data that is sent from a public line, etc.

The RIP process unit 5 generates image data by interpreting/rendering PDL (Page Description Language) that is sent from a network, etc.

The scanner unit 7 generates image data by optically scanning an original.

The image process unit 8 processes images, for example, by converting a read image to printable image data, adjusting the color, brightness, fineness, etc. of the image, and discriminating the image to convert the image so as to obtain a higher-quality print output.

The electronic media read unit 9 reads image data from, for instance, a CD-ROM or a memory card such as a Compact Flash.

The printer unit 12 prints out image data, which is generated by the above-described functional units, to paper.

In addition, there are provided the program execution unit 2 which executes a program for properly controlling the functional blocks, a temporary memory area which is necessary for executing processes, the memory unit 3 which stores data for a necessary time period, the display unit 10, the operation unit 11 for enabling the user to operate the apparatus, and the data input/output unit 13 for data exchange with an external device (not shown).

Besides, there is provided the sorting unit 6 for properly sorting paper sheets, on which printing is effected by the printer unit 12.

The program execution unit 2 includes a counter, as will be described later in detail.

As has been described above, the main function of the MFP apparatus 1 is to print image data, which is input from various input devices, to paper, and there occurs a competition with the printer unit 12. Thus, in order to enhance the convenience for users and the operation rate of the apparatus, it is an important technique to optimally control the order of print outputs in a case where a plurality of print jobs are overlapped.

As such a technique, there is known a method as disclosed in Jpn. Pat. Appln. KOKAI Publication No. 2001-127928, wherein the priority for each kind of job is set, and an estimated time until completion of print is set, and the print order of jobs is controlled by using these parameters.

In this method, however, there is a tendency that the priority is basically fixed according to the kind of job. For example, there is a case where a confirmation of transmission of facsimile from an important customer has come while a print operation, which requires a long time, is being performed. In such a case, there may be a need to increase the priority of facsimile, which is normally set at a low level. In this case, in order to temporarily change the priority level, it is necessary to execute an exceptional process, such as changing the setting or canceling the printing process. In addition, although the estimated time until completion of print may be approximately calculated on the basis of the file size or the kind of PDL, the estimation is not perfect. As a result, the estimation may become erroneous, and a proper control of priority may fail.

In the present invention, the preset priority for each kind of job or the print estimated time with low precision is not used. Instead, the print order of pages of print images, which are generated by each job, is controlled so as to maximize the operation rate of the print engine. Printed matters, which include pages of respective jobs in a mixed fashion, are sorted according to jobs. Thereby, grouping, which is similar to the prior art, is executed, thereby realizing a print control with a high customer satisfaction level, which requires no exceptional operation.

Figure 2:
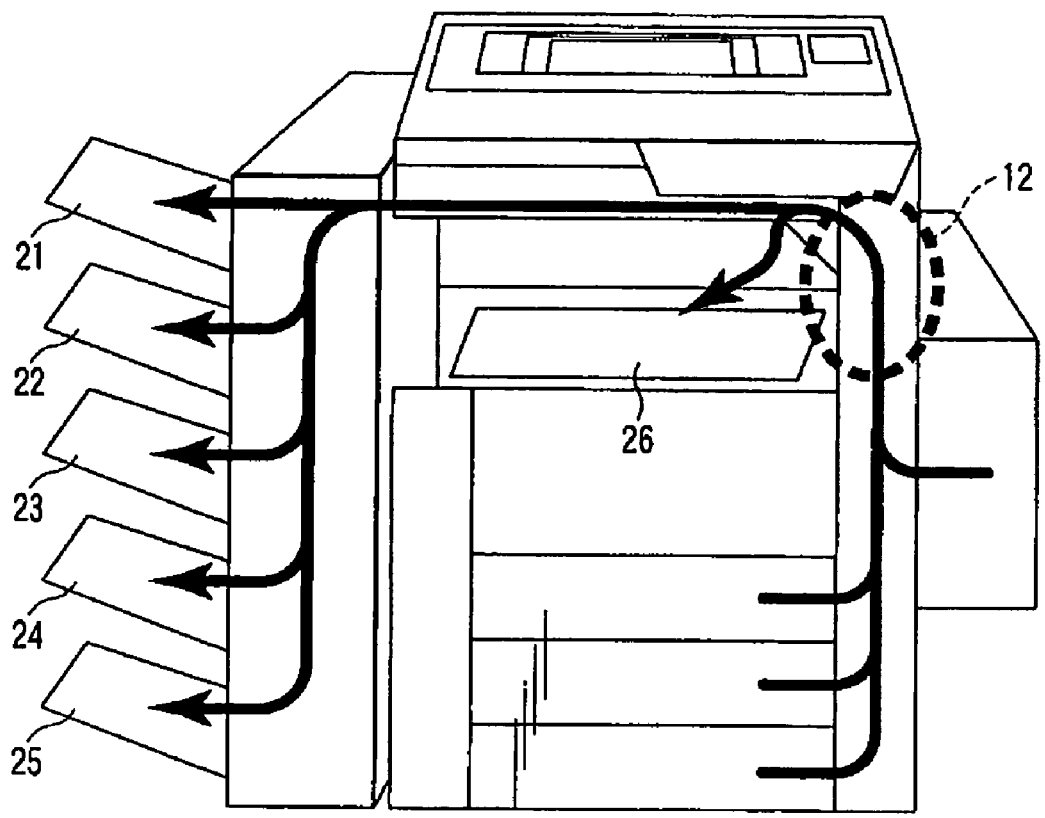
FIG. 2 is a view illustrating a sorting function that is provided in the MFP apparatus, which is necessary for the invention.

FIG. 2 illustrates a sorting function that is provided in the MFP apparatus 1, which is necessary in the present invention. Specifically, the MFP apparatus 1 includes paper output destinations 21 to 26. Print images, which are generated by copying, facsimile, network print, internal data print, etc., are printed on paper sheets by the printer unit 12, and are sorted and output to the paper output destinations 21 to 26 according to jobs. The number of paper output destinations is six in FIG. 6. Alternatively, the number of paper output destinations may be decreased or increased according to the degree of overlapping of print jobs.

Figure 3:
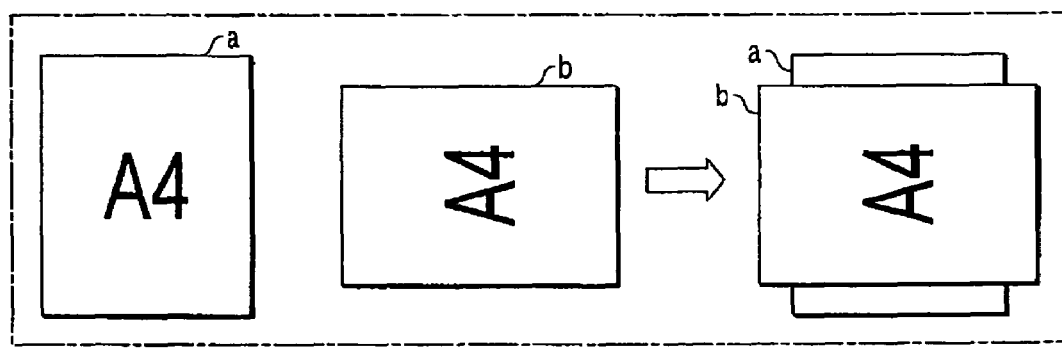
FIG. 3 is a view illustrating a method of executing job-by-job sorting by changing the direction of paper.

FIG. 3 illustrates a method of sorting paper sheets according to jobs by changing the direction of paper sheets, without executing mechanical sorting. Specifically, an A4-size sheet a is output in a vertical direction, and an A4-size sheet b is output in a horizontal direction. Thereby, even if the A4-size sheet a and the A4-size sheet b are stacked, easy sorting can be realized.

Although it is difficult to execute sorting by this function alone, the flexibility in sorting methods can be provided by combining the paper output destinations 21 to 26 in FIG. 2.

Next, the print order control in the case where print jobs are overlapped is described. As a simplest example, overlapping between a network print job and a facsimile print job is described.

FIG. 4 illustrates a timing of generation/print of pages of respective print jobs in the prior art. An axis of RIP indicates print image generation for network print, an axis of facsimile (FAX) indicates print image generation of facsimile, and an axis of an engine in the printer unit indicates a timing of actual printing on paper. In general, the time needed for generation of print images in network print differs depending on the degree of complexity of documents, and is not uniform. In addition, the time needed for receiving encoded data is long, and the engine of the printer unit operates intermittently and the operation rate of the printer engine lowers. In short, the engine of the printer unit repeats intermittent operations at the time of network print.

FIG. 5 illustrates an example in which facsimile print is executed by interrupt while network print is being executed, by the print order control according to the present invention. In this invention, facsimile print images are inserted in printable time periods, as indicated by the axis of the engine of the printer unit 12. Thereby, the intermittent operation of the engine of the printer unit 12 is minimized, and the operation rate of the engine is increased.

Figure 6:
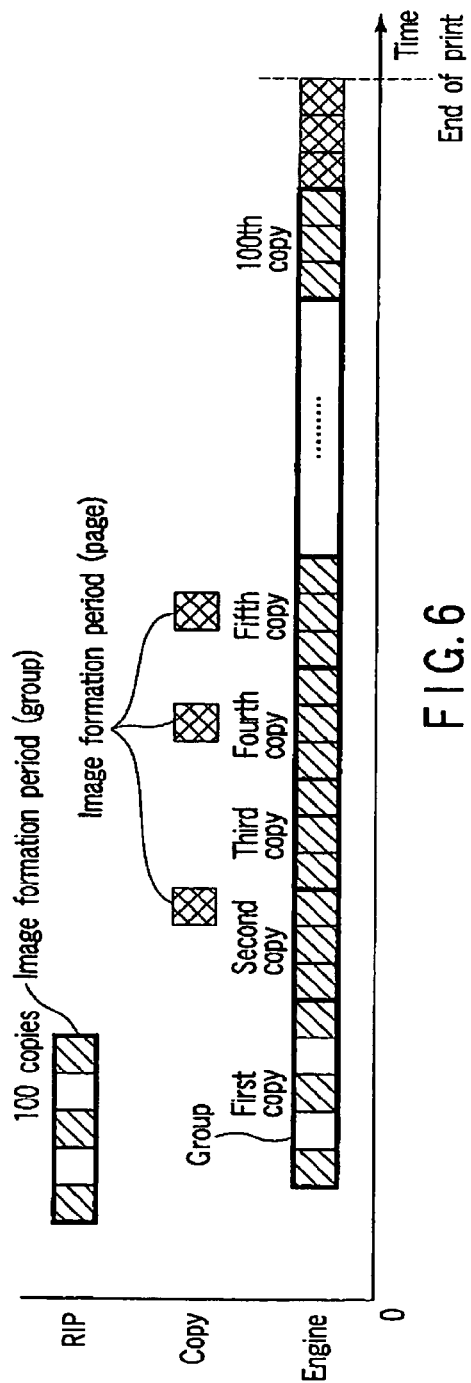
FIG. 6 shows prior art in a case where 100 copies are printed by network print.

FIG. 6 shows a prior-art example in which 100 copies are printed by network print. The non-uniformity in network print time occurs only at the time of printing a first copy. Second and following copies are printed by re-using generated print image data. Thus, the print can be performed at the speed of the print engine, and there is no time gap for interrupt. Hence, the print job for copying is executed after the 100th copy.

Figure 7:
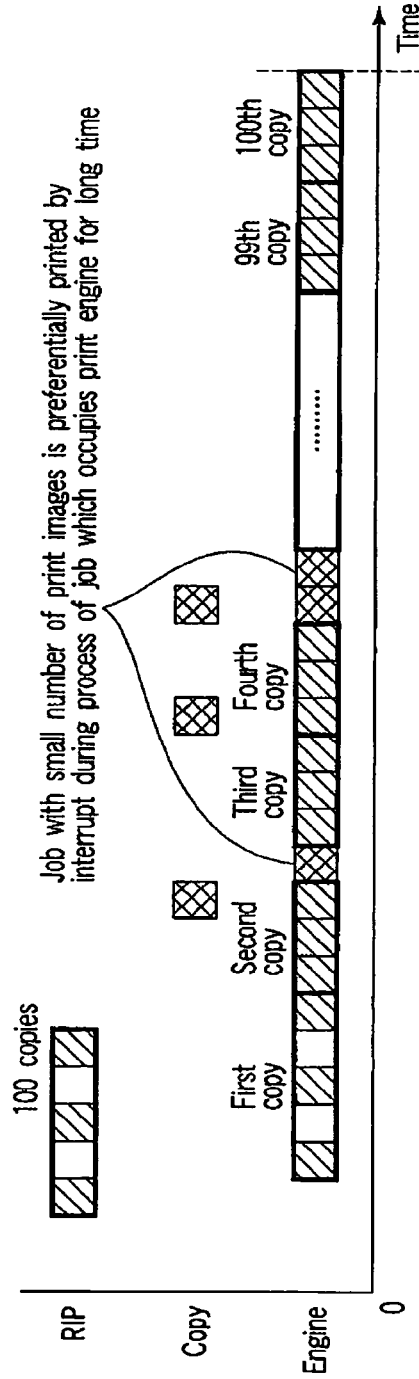
FIG. 7 shows an example in which 100 copies are printed by network print according to the present invention.

In the present invention, as shown in FIG. 7, a print process of a copying job with a small number of copies is executed by interrupt at a break point between copies. The number of copies for interrupt may be limited in advance. If more than a preset number of copies of the copying job are to be printed, a wait time is needed. In this manner, at a time of printing a large number of copies, the time of completion of print of a large number of copies is slightly delayed. Thereby, the print wait time of a print job with a small number of copies can be decreased, and the degree of dissatisfaction of both users can be minimized. Specifically, when the second copy of the network print job is finished, a print image of the copying job is generated and a first copy of the copying job is printed. Then, third and fourth copies of the network print job are printed, following which second and third copies of the copying job are printed. Then, copies of the network print job are printed up to a 100th copy.

Next, a description is given of the case where print jobs with large numbers of copies are overlapped.

FIG. 8 shows a timing in the prior art in a case where a network print job for 100 copies and a copying job for 20 copies are overlapped. After a job with a higher priority is completed, a subsequent job is executed. Thus, after 100 copies of the network print job are printed, 20 copies of the copying job are printed.

Figure 9:
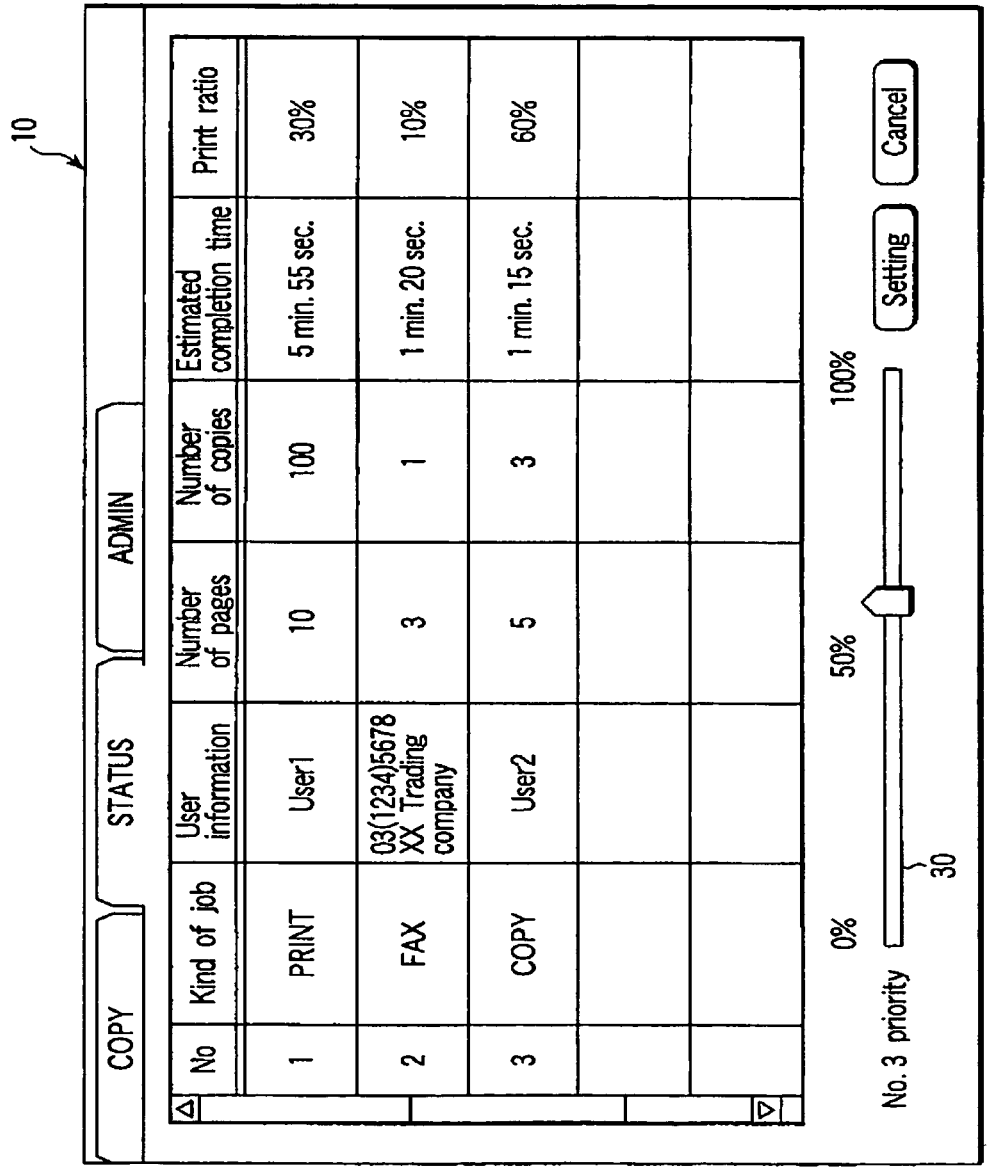
FIG. 9 shows an example of a setting screen that is displayed on a display unit.

In the present invention, a UI (User Interface) for determining a print ratio per unit time is presented on a setting screen that is displayed on the display unit 10, as shown in FIG. 9. By altering the print ratio, the time of completion of a plurality of overlapping jobs is adjusted.

FIG. 10 shows an example in which this adjusting function is used to set the print ratio of the copying print job at 100%, and thus a network print job is executed after completion of print of 20 copies of the copying job. Specifically, after a third copy of the network print job is printed, print images of the copying job are generated and 20 copies of the copying job are printed by interrupt. Thereafter, the remaining fourth to 100th copies of the network print job are printed.

Figure 11:
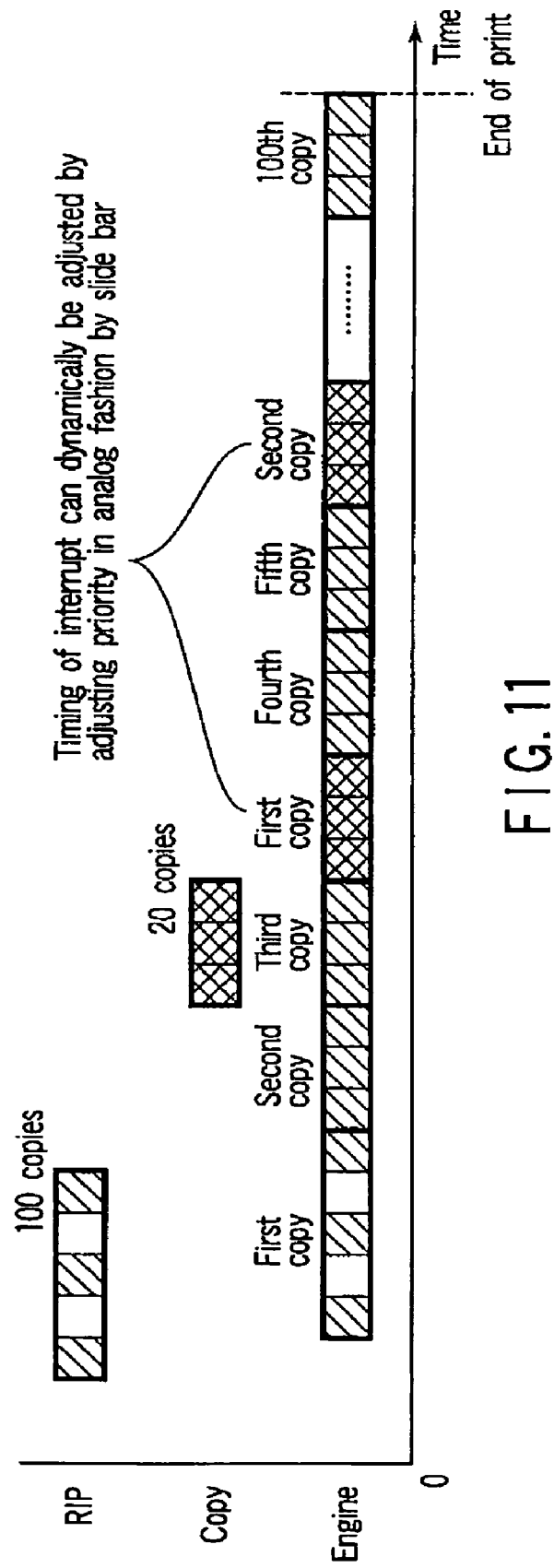
FIG. 11 illustrates a timing in the present invention in a case where a network print job for 100 copies and a copying job for 20 copies are overlapped.

FIG. 11 shows an example in which the print ratio of the copying job is set at 33% and printing per unit time is executed at a ratio of 1 (copying):2 (network print). Specifically, when print of a third copy of the network print job is finished, a print image of the copying job is generated and a first copy of the copying job is printed. Subsequently, fourth and fifth copies of the network print job are printed, following which a second copy of the copying job is printed. Then, a subsequent network print job is executed. In this manner, the network print job and copying job are executed at a ratio of 2:1.

FIG. 9 shows the setting screen displayed on the display unit 10. A line corresponding to a job, for which alteration is desired, is selected, and a slide bar 30 displayed at a lower-most part is shifted. Thereby, the print ratio of each job is displayed. In the present case, jobs, which require output of sheets in units of copies as in a case of a staple process, are overlapped. If there is no such restriction, the print-out may be executed in units of a page, and not in units of a copy, as shown in FIG. 5.

Next, the print operation of the present invention having the above-described structure is described with reference to flow charts of FIGS. 12 to 15.

Figure 12:
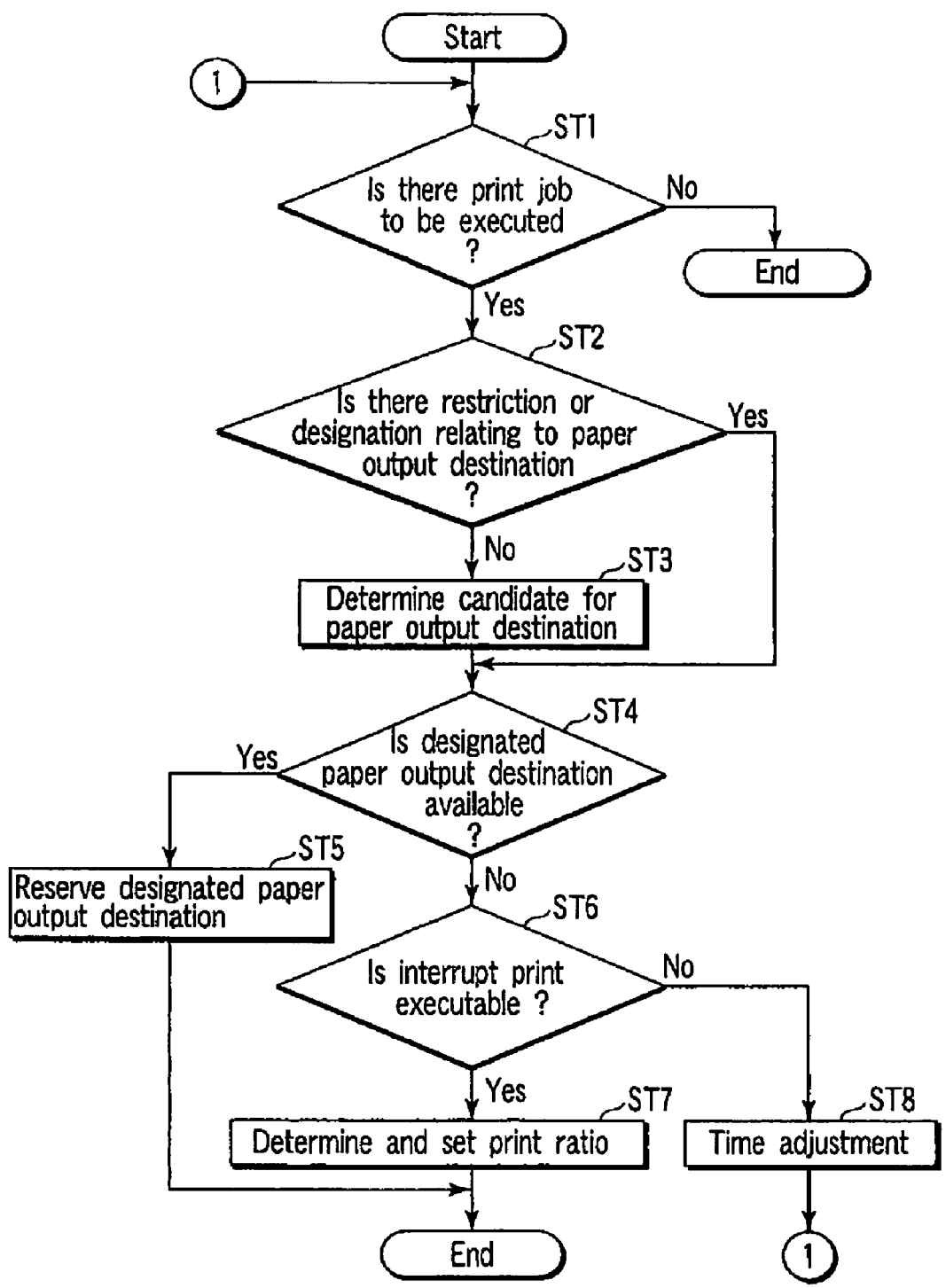
FIG. 12 is a flow chart illustrating an operation for determining a paper output destination.

To begin with, an operation for determining a paper output destination is described referring to the flow chart of FIG. 12.

The program execution unit 2 confirms whether there is a print job to be executed (ST1). If there is no print job, the process is finished.

If there is a print job, the program execution unit 2 confirms whether there is restriction or designation relating to the paper output destination (ST2). If there is no restriction or designation, a candidate for paper output destination is determined (ST3).

In this case, the program execution unit 2 confirms whether the determined paper output destination or designated paper output destination is available (ST4). If it is available, the paper output destination is reserved (ST5).

If the paper output destination that is designated in step ST4 is not available, the program execution unit 2 confirms whether interrupt print is executable (ST6). If interrupt print is executable, the print ratio is determined and set (ST7).

If interrupt print is not executable in step ST6, the program execution unit 2 executes time adjustment (ST8) and returns to step ST1.

Figure 13:
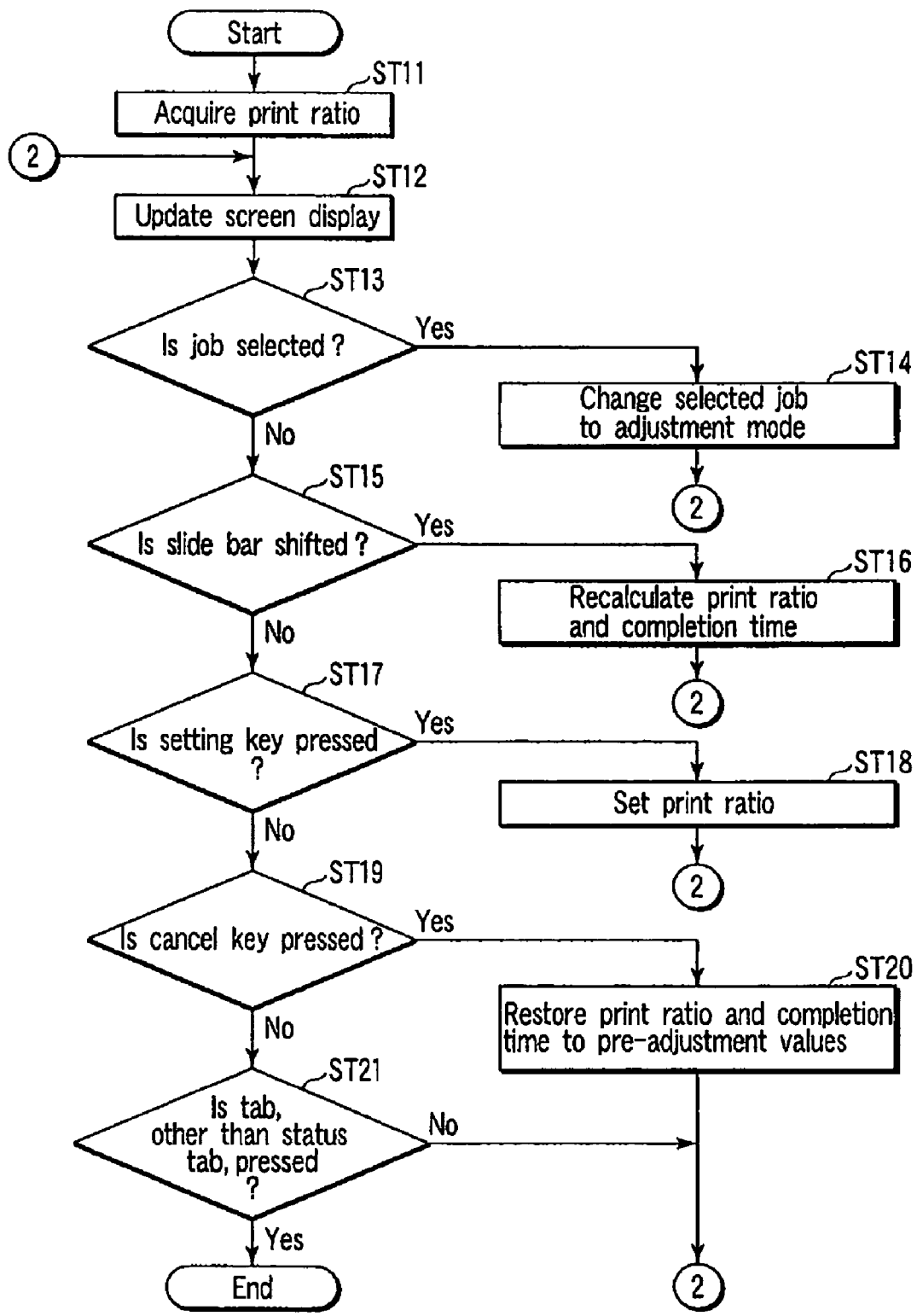
FIG. 13 is a flow chart illustrating an operation for adjusting a print ratio.

Next, an operation for adjusting the print ratio is described referring to the flow chart of FIG. 13.

The program execution unit 2 acquires a print ratio (ST11) and updates screen display on the display unit 10 (ST12).

If a job is selected on the updated screen display on the display unit 10 (ST13), the program execution unit 2 changes the selected job to an adjustment mode (ST14) and returns to step ST12.

If the slide bar 30 is shifted on the updated screen display on the display unit 10 (ST15), the program execution unit 2 re-calculates the print ratio and time of completion (ST16) and returns to step ST12.

If a setting key on the updated screen display on the display unit 10 is pressed (ST17), the program execution unit 2 sets the print ratio (ST18) and returns to step S12.

If a cancel key on the updated screen display on the display unit 10 is pressed (ST19), the program execution unit 2 restores the print ratio and the time of completion to pre-adjustment values (ST20) and returns to step S12.

If a tab, other than the STATUS tab, on the updated screen display on the display unit 10 is pressed (ST21), the program execution unit 2 finishes the print ratio adjustment operation.

Next, the operation for determining a print image is described referring to the flow chart of FIG. 14.

The program execution unit 2 confirms whether there is image data to be printed (ST31). If there is image data, the program execution unit 2 determines image data to be printed, on the basis of a count value of each job (ST32).

The program execution unit 2 confirms whether there is a need to consider a break point of copies at a time of printing (ST33).

If there is no need to consider a break point of copies, the program execution unit 2 confirms whether there is image data of the determined job (ST34).

If there is image data of the determined job, the program execution unit 2 prints the image data of the job by the printer unit 12 (ST35), increments the print ratio determination count of the job by +1 (ST36) and returns to step ST31.

If there is no image data of the determined job in step S34, the program execution unit 2 determines the next print image data on the basis of the count value of each job (ST37) and returns to step ST33.

If there is a need to consider a break point of copies in step ST33, the program execution unit 2 confirms whether there is a break point of copies (ST38). If there is a break point of copies, the program execution unit 2 advances to step ST35.

If there is no break point of copies in step ST38, the program execution unit 2 determines the next print image data on the basis of the count value of each job (ST39) and returns to step ST33.

Figures 15, 16, 17:
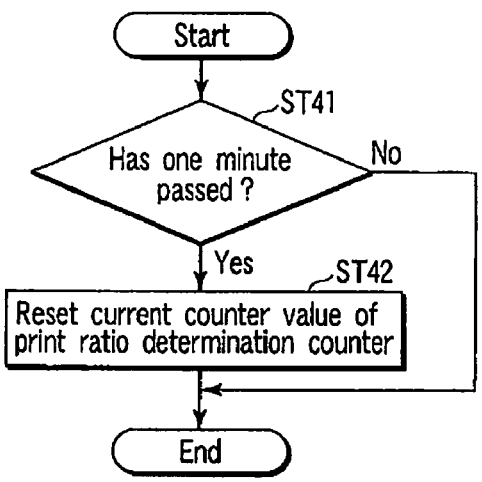
FIG. 15 is a flow chart illustrating a counter reset operation for determining a print image.
FIG. 16 shows an engine speed and a time until counter reset.
FIG. 17 shows an example of a priority order determination table for print images.

At last, a counter reset operation for print image determination is described referring to the flow chart of FIG. 15.

The program execution unit 2 confirms whether one minute has passed by the timer 14 (ST41). If one minute has passed, the program execution unit 2 resets the current counter value in the print ratio determination counter.

FIG. 16 shows an engine speed and a time until counter reset. These are parameters necessary for determining distribution of print images. The parameters are the engine speed (number of sheets/minute) of the printer unit 12 and the remaining time until counter reset.

FIG. 17 shows an example of a priority order determination table for print images. Print distribution values are calculated from the set values of print ratios, the number of printable sheets per unit time and the remaining time until counter reset (elapsed time).

The calculation formula is as follows:

print distribution value=engine speed per unit time× print ratio/100×elapsed time/60.

A difference between this value and the current count value is found. As the difference increases (i.e. as the difference value increases to the negative side), the priority is increased.

As has been described above, according to the embodiment of the present invention, there is no need to set the priority order for each kind of job, as in the prior art. When print jobs are overlapped, print-out of a job with a higher priority is not simply executed. The print-out of print jobs can fairly be executed at a ratio per unit time, which is desired by users. Therefore, print-out can be executed with a low degree of dissatisfaction.

Specifically, according to the present invention, there is provided a print processing method for a printer that has a plurality of functions and a plurality of paper output methods and executes print for each of the functions, comprising: executing, when prints by the plurality of functions are simultaneous/parallel processed, printing of print images, which are created by image processes associated with the respective functions, by calculating a print order on the basis of a time at which each print image is created and a preset print process ratio between the functions; executing, when the preset print process ratio is altered where necessary during the printing, printing of remaining print images at the time of the alteration by re-calculating the print order on the basis of the altered process ratio; and sorting paper sheets, on which the printing is effected, according to each of the functions by the plurality of paper output methods.

The time at which each print image is created is a time at which a print image of a minimum unit of print is created, the print order is calculated on the basis of the time of creation of the print image which is created in units of one page at a single-side print time, and the print order is calculated on the basis of the time of creation of the print images which are created in units of two pages at a double-side print time.

The time at which each print image is created is a time at which a print image is created at each break point of copies when a copy-unit process needs to be executed in units of a plurality of pages, such as a staple process or a book-binding process, and the print order is calculated on the basis of the time of creation.

The preset print process ratio is a ratio of a number of pages that are printed per unit time according to each of the functions.

A print order determination table for print processes is created using the preset print process ratio, and the print processes of the plurality of functions are executed with reference to the print order determination table for print processes.

When the preset print process ratio is altered during the print process, a print completion estimated time and the print process ratio are re-calculated, the print completion estimated time and the print process ratio, which are results of the re-calculation, are displayed, and the displayed print completion estimated time and the print process ratio are determined, thereby altering a ratio of a number of pages that are printed per unit time according to each of the functions.

The plurality of paper output methods are methods in which paper output destinations are distributed according to the functions to a plurality of mechanically constructed trays.

The plurality of paper output methods are methods in which paper sheets are output together according to each of the functions by turning a direction of output sheets or inserting sheets for sorting.

Further, according to the present invention, there is provided a printer that has a plurality of functions and a plurality of paper output methods and executes print for each of the functions, comprising: a printing unit which prints a print image that is created by each of the functions; a setting unit which sets, when prints by the plurality of functions are simultaneous/parallel processed, a print process ratio between the functions, which is used to determine a priority of print processes; a processing unit which executes a print process by the printing unit, by determining a print order on the basis of the print process ratio between the functions, which is preset by the setting unit, and a time at which each print image according to each function is created; an altering unit which alters the print order, when the print process ratio is altered by the setting unit where necessary during the print process by the processing unit, by re-calculating the print order on the basis of a number of remaining print images at the time of the alteration and the altered print process ratio; and a control unit which executes a control to sort paper sheets, which are printed by the printing unit, according to each of the functions by the plurality of paper output methods.

Furthermore, according to the invention, there is provided a printer that has a plurality of functions and a plurality of paper output methods and executes print for each of the functions, comprising: printing means for printing a print image that is created by each of the functions; setting means for setting, when prints by the plurality of functions are simultaneous/parallel processed, a print process ratio between the functions, which is used to determine a priority of print processes; processing means for executing a print process by the printing means, by determining a print order on the basis of the print process ratio between the functions, which is preset by the setting means, and a time at which each print image according to each function is created; altering means for altering the print order, when the print process ratio is altered by the setting means where necessary during the print process by the processing means, by re-calculating the print order on the basis of a number of remaining print images at the time of the alteration and the altered print process ratio; and control means for executing a control to sort paper sheets, which are printed by the printing means, according to each of the functions by the plurality of paper output methods.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A print processing method for a printer that has a plurality of functions and a plurality of paper output methods and executes print for each of the functions, comprising:

executing, when prints by the plurality of functions are simultaneous/parallel processed, printing of print images, which are created by image processes associated with the respective functions, by calculating a print order on the basis of a time at which each print image is created and a preset print process ratio between the functions;

executing, when the preset print process ratio is altered where necessary during the printing, printing of remaining print images at the time of the alteration by re-calculating the print order on the basis of the altered process ratio; and sorting paper sheets, on which the printing is effected, according to each of the functions by the plurality of paper output methods.

2. The print processing method according to claim 1, wherein the time at which each print image is created is a time at which a print image of a minimum unit of print is created, the print order is calculated on the basis of the time of creation of the print image which is created in units of one page at a single-side print time, and the print order is calculated on the basis of the time of creation of the print images which are created in units of two pages at a double-side print time.

3. The print processing method according to claim 1, wherein the time at which each print image is created is a time at which a print image is created at each break point of copies when a copy-unit process needs to be executed in units of a plurality of pages, such as a staple process or a book-binding process, and the print order is calculated on the basis of the time of creation.

4. The print processing method according to claim 1, wherein the preset print process ratio is a ratio of a number of pages that are printed per unit time according to each of the functions.

5. The print processing method according to claim 1, wherein a print order determination table for print processes is created using the preset print process ratio, and the print processes of the plurality of functions are executed with reference to the print order determination table for print processes.

6. The print processing method according to claim 1, wherein when the preset print process ratio is altered during the print process, a print completion estimated time and the print process ratio are re-calculated, the print completion estimated time and the print process ratio, which are results of the re-calculation, are displayed, and the displayed print completion estimated time and the print process ratio are determined, thereby altering a ratio of a number of pages that are printed per unit time according to each of the functions.

7. The print processing method according to claim 1, wherein the plurality of paper output methods are methods in which paper output destinations are distributed according to the functions to a plurality of mechanically constructed trays.

8. The print processing method according to claim 1, wherein the plurality of paper output methods are methods in which paper sheets are output together according to each of the functions by turning a direction of output sheets or inserting sheets for sorting.

9. A printer that has a plurality of functions and a plurality of paper output methods and executes print for each of the functions, comprising:

a printing unit which prints a print image that is created by each of the functions;

a setting unit which sets, when prints by the plurality of functions are simultaneous/parallel processed, a print process ratio between the functions, which is used to determine a priority of print processes;

a processing unit which executes a print process by the printing unit, by determining a print order on the basis of the print process ratio between the functions, which is preset by the setting unit, and a time at which each print image according to each function is created;

an altering unit which alters the print order, when the print process ratio is altered by the setting unit where necessary during the print process by the processing unit, by re-calculating the print order on the basis of a number of remaining print images at the time of the alteration and the altered print process ratio; and a control unit which executes a control to sort paper sheets, which are printed by the printing unit, according to each of the functions by the plurality of paper output methods.

10. A printer that has a plurality of functions and a plurality of paper output methods and executes print for each of the functions, comprising:

printing means for printing a print image that is created by each of the functions;

setting means for setting, when prints by the plurality of functions are simultaneous/parallel processed, a print process ratio between the functions, which is used to determine a priority of print processes;

processing means for executing a print process by the printing means, by determining a print order on the basis of the print process ratio between the functions, which is preset by the setting means, and a time at which each print image according to each function is created;

altering means for altering the print order, when the print process ratio is altered by the setting means where necessary during the print process by the processing means, by re-calculating the print order on the basis of a number of remaining print images at the time of the alteration and the altered print process ratio; and control means for executing a control to sort paper sheets, which are printed by the printing means, according to each of the functions by the plurality of paper output methods.

* * * * *